C. ROSWAG & A. N. De PAUVILLE.
Separating Gold and Silver from Lead Containing the Same.

No. 138,938.                                                    Patented May 13, 1873.

WITNESSES. John K. Rupertus.
J. S. Senale

Clement Roswag
an Alfred Nicolle de Pauville
by their Attys.
Howson and Son

UNITED STATES PATENT OFFICE.

CLEMENT ROSWAG AND ALFRED NICOLLE DE PAUVILLE, OF PARIS, FRANCE.

IMPROVEMENT IN SEPARATING GOLD AND SILVER FROM LEAD CONTAINING THE SAME.

Specification forming part of Letters Patent No. 138,938, dated May 13, 1873; application filed January 2, 1873.

*To all whom it may concern:*

Figure 1:
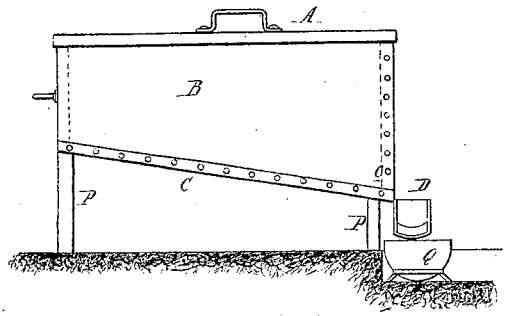
Figure 2:
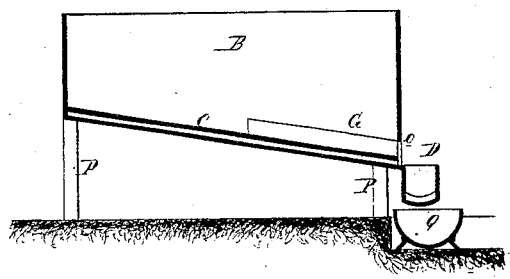
Figure 3:
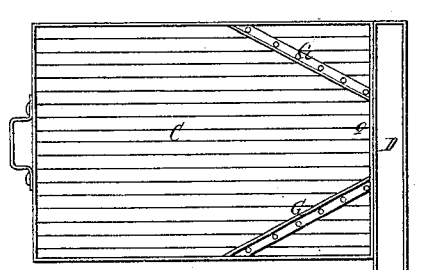
Figure 4:
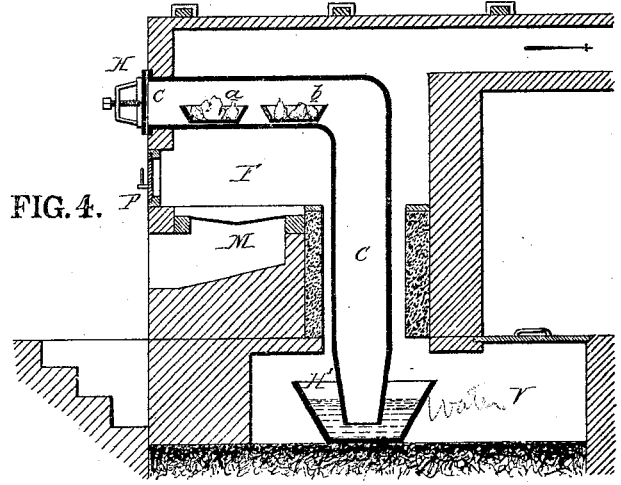
Figure 6:
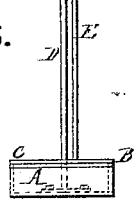
Figure 5:
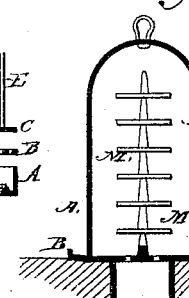
Figure 5:
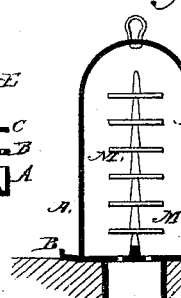
Figure 7:
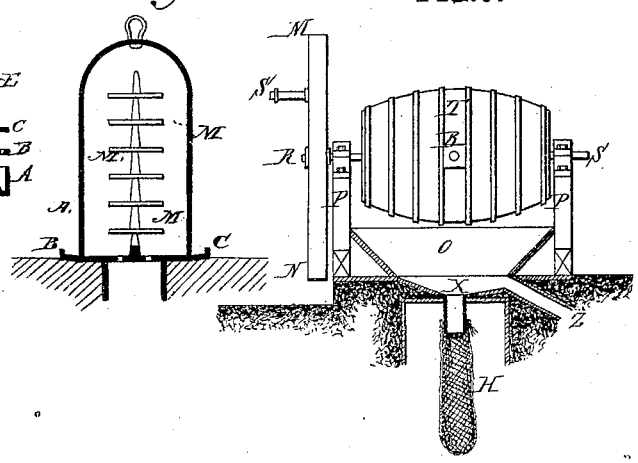

Be it known that we, CLEMENT ROSWAG and ALFRED NICOLLE DE PAUVILLE, both of Paris, in France, have invented Improvements in Separating Gold and Silver from Lead containing the same, of which the following is a specification:

The object of our invention is to recover silver or gold from leads containing the same by the use of zinc, magnesium, or aluminium, or alloys thereof, with little loss of the reacting metal or alloy. The first part of our invention relates to the extracting of the silver from the lead, forming a dross; secondly, to the treatment of the said dross for the purpose of separating the aluminium therefrom, and of preparing for the third operation for the recovery of the reacting agents in a metallic state. To extract the precious metal from the lead, zinc, magnesium, aluminium, or alloys of these metals may be employed. We prefer an alloy of zinc and aluminium in any suitable proportions. An alloy of sixty-five of zinc and thirty-five of aluminium has succeeded perfectly, and an alloy containing one-twentieth part of aluminium will be found to work better than aluminium alone. In adding the aluminium or other metal or alloy to the lead, we place the ingot in the box, A, Fig. 6, force the box to the bottom of the vessel containing the molten lead, and then remove the top C of the box by elevating the rod E, thus permitting the metal to rise through a perforated plate, B, at the top of the box. The rich scums or dross obtained as above, or by the treatment with zinc or other metal alone, or alloy, is skimmed off and placed on an iron plate and heated to a low temperature, when it may be very readily disintegrated by pounding or grinding. The powder thus obtained is sifted, (the larger portions being returned to the plate, heated, and again pulverized,) and introduced with mercury into a rotating amalgamating vessel, B, Fig. 7, preferably with acidulated water and particles of iron. If the dross contains aluminium, it will not amalgamate, but the zinc, silver, and lead readily unite with the mercury, as usual. By the addition of a sufficient quantity of mercury as soon as the amalgamation is complete, the aluminium may be recovered directly and removed from the mass by means of a ladle and reserved for the next operation. The excess of mercury is removed from the alloy by pressing the latter in a bag of wool or chamois-skin, and the pasty remainder is dried by exposure to the air until it may be readily pulverized, when it is placed upon the inclined bottom of a metal tank, C, Figs. 1 and 2, where it is gradually heated. The effect of heat upon the mixture is to first fuse the lead, which, carrying with it the greater portion of the silver, runs down the plate C, and is directed by inclined ribs G G to a trough, D. The zinc alloy, less fusible than the lead, remains on the plate and is again amalgamated, to remove as much of the silver as possible, and again treated as before. The effect of these last-described operations is to form two masses, one, $a$, being a rich alloy of the silver, gold, and lead, and the other, $b$, a poor alloy of the precious metal and zinc. To recover the mercury remaining in both masses, they are placed in separate pans in a retort, C, closed at one end by a cap, H, and the other end extending into a vessel, H′, of water, in which the mercurial vapors are condensed when the tube is heated. Instead of this apparatus, that shown in Fig. 5 may be used, the material being placed on parallel shelves M, covered by a bell, A, which is heated by external fire, the vapors passing downward through perforations in the bottom. The rich argentiferous or auriferous mass of lead $a$ (which does not contain one-tenth the lead in the original mass) may be readily refined by any desired process, the loss of lead being comparatively small. To the mass $b$ of zinc, (which contains but little precious metal,) is added either a little tar, which prevents the zinc from oxidizing, when it is heated, and thereby reduced to a metallic state; or the like result is attained by fusing with a slight quantity of lead, the presence of which does not interfere with the employment of the zinc when again required for the first-named operations; and in these operations any trace of precious metal remaining in the zinc is recovered in connection with that in the new lead, which is treated with the zinc.

Although we have described certain apparatus for carrying out our invention, it will be apparent that apparatus of different kinds may be employed.

Claims.

1. The employment, in recovering precious metals from lead, of aluminium alone or alloyed with other metals, as set forth.

2. Amalgamating the dross formed in treating the lead with a reacting metal or alloy, substantially as described.

3. The recovery of aluminium from the dross by treating the same with mercury, as set forth.

In testimony whereof we have signed our names to this specification in the presence of two subscribing witnesses.

CLEMENT ROSWAG.
ALFRED NICOLLE DE PAUVILLE.

Witnesses:
 EUGENE ARMENGAUD,
 EDMOND CHIBAULT.